Aug. 19, 1969     G. E. BEYER     3,461,791
AIR DISTRIBUTION GRILL
Filed June 19, 1968     3 Sheets-Sheet 2
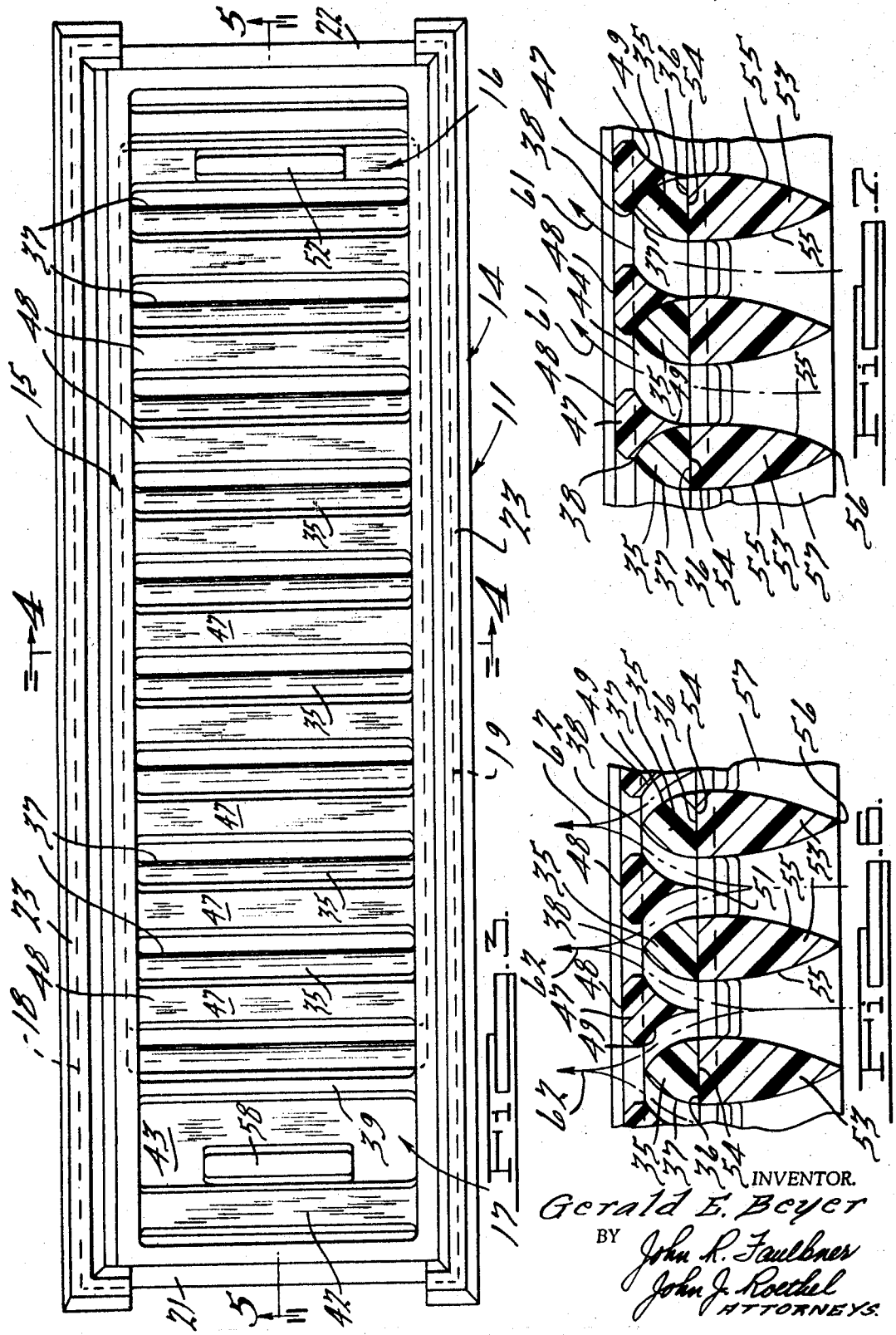

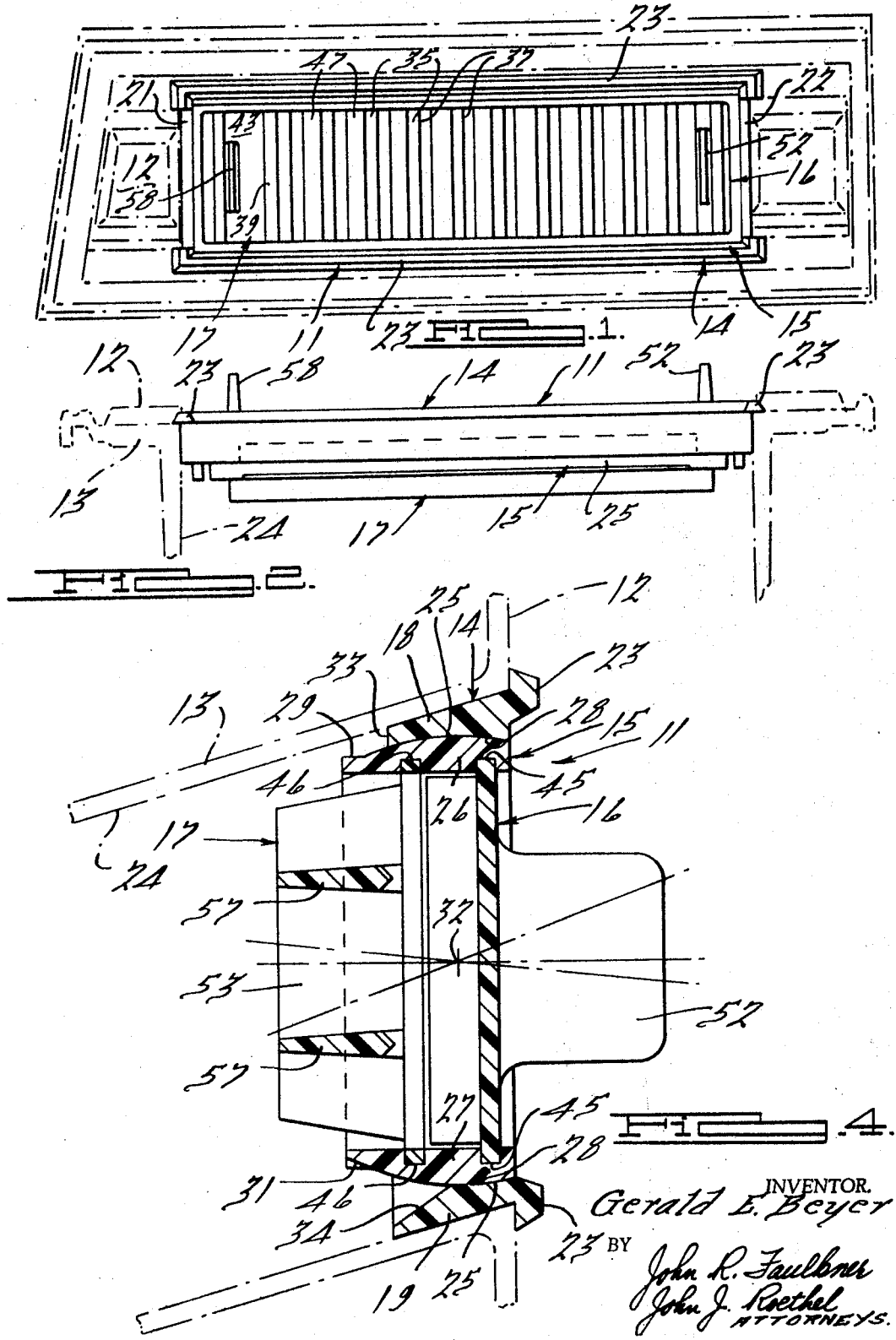

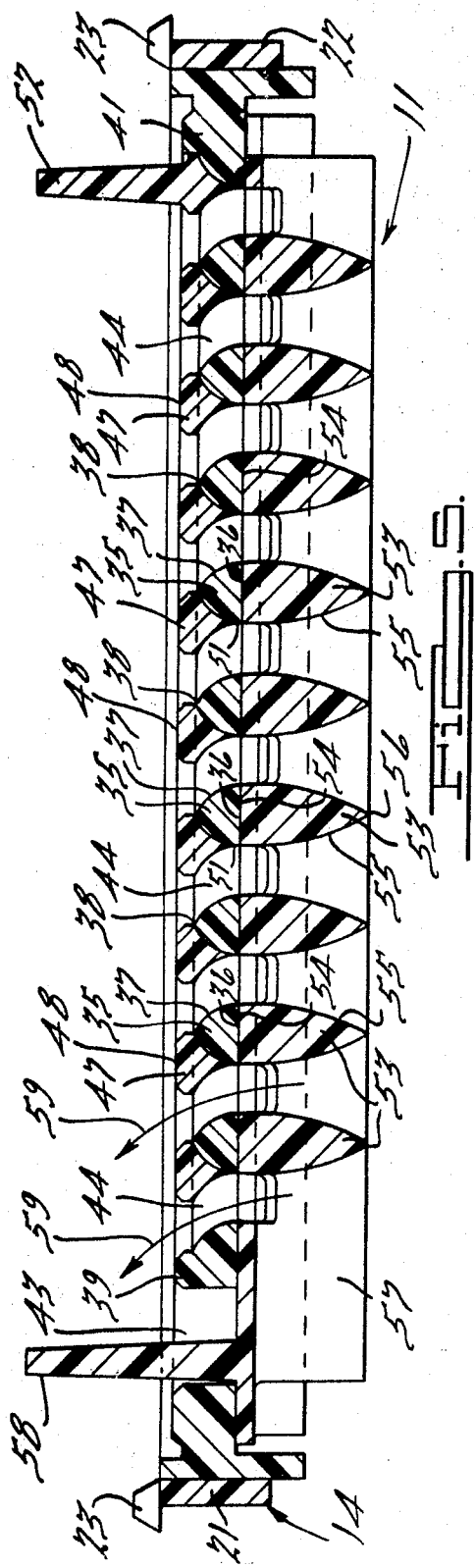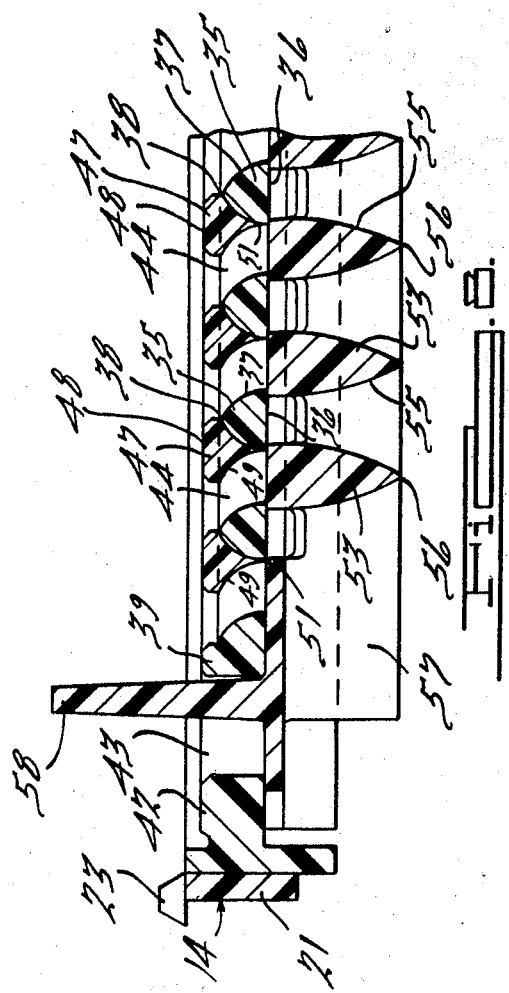

United States Patent Office 3,461,791
Patented Aug. 19, 1969

3,461,791
AIR DISTRIBUTION GRILL
Gerald E. Beyer, Lathrup Village, Mich., assignor to Ford Motor Company, Dearborn, Mich., a corporation of Delaware
Filed June 19, 1968, Ser. No. 738,316
Int. Cl. F24f 13/12
U.S. Cl. 98—40    5 Claims

ABSTRACT OF THE DISCLOSURE

An air distribution grill, particularly adapted to be mounted on an interior panel of the vehicle body such as the instrument panel, comprising a frame member, a body member fitted in the frame member for pivotal movement about a longitudinal axis, and shutter members slidably supported in the body member. The body member and shutter members each have a plurality of spaced ribs with the spaces therebetween providing air flow apertures. Through selective positioning of the shutter members on the body members, the spaced ribs are utilized to control the quantity and direction of air flow.

BACKGROUND OF THE INVENTION

An air distribution grill, particularly one used as an air outlet register for an automobile air conditioner system must meet rather stringent requirements. It must provide for control of both volume and direction of flow of air discharged through the grill with a minimum of movable components compactly fitted together. This assembly must be rattle free and substantially resistant to corrosion caused by condensate resulting from cool air flow. The components must be easily assembled, preferably as a complete unit which may be readily installed in a vehicle body panel such as an instrument panel.

Accordingly, it is an object of the present invention to provide an air distribution grill which may be assembled from a minimum number of parts, such as four, the parts preferably being of molded plastic and snapped together and retained in assembled condition without fasteners or other mechanical retention devices. The molded plastic parts are substantially rattle free, at least from a sound creating standpoint, and are substantially corrosion resistant.

SUMMARY OF THE INVENTION

The air distribution grill comprising the present invention comprises an elongated frame member and an elongated body member supported within the frame member. The frame member and the body member each have substantially parallel interengaged, complementarily curved side walls providing for limited tilting movement of the body member relative to the frame member about a longitudinal axis. Front and rear shutter members are slidably supported in track means formed in the body member. The shutter members are in juxtaposition to the front and rear faces, respectively of the body member and are slidable longitudinally thereof. The body member and the front and rear shutter members are provided with a plurality of laterally spaced contoured ribs with the spaces between the latter providing air flow apertures. The front and rear shutter members are positionable independently of each other on the body member to relatively position the spaced ribs to control both the quantity and direction of air flow through the air distribution grill.

More specifically, the body member and rear shutter ribs are relatively positionable to control the quantity of air flowing through the air grill. The body member and front shutter member ribs are relatively positionable to provide air flow channels which direct the air flow selectively toward either end of the air distribution grill or when in an intermediate position direct the air flow substantially normal to the front face of the air distribution grill.

The components of the air distribution grill assembly lend themselves readily to being molded of plastic and to being preassembled before installation into the vehicle body.

DESCRIPTION OF THE DRAWING

Other objects, advantages and features of the present invention can be made more apparent as this description proceeds, reference being had to the accompanying drawings, wherein:

FIG. 1 is a front elevation of the air distribution grill embodying the present invention shown mounted in a portion of a vehicle body instrument panel or the like, the latter being shown in dot and dash outline;

FIG. 2 is a side elevational view of FIG. 1;

FIG. 3 is an enlarged front elevation of the air distribution grill embodying the present invention;

FIG. 4 is a section view on the line 4—4 of FIG. 3;

FIG. 5 is a section view on the line 5—5 of FIG. 3; and

FIGS. 6, 7 and 8 are fragmentary views of parts similar to FIG. 5 illustrating the different air flow conditions that may be obtained with the air distribution grill embodying the present invention.

DETAILED DESCRIPTION OF THE INVENTION

Referring now to the drawings, the air distribution grill, generally designated 11, is adapted to be mounted in substantially flush relationship to the surface 12 of a vehicle body panel 13, the latter being shown in dot and dash outline in FIGS. 1 and 2. The portion of the body panel 13 illustrated is a portion of a vehicle instrument panel, but it could be a cowl panel, door panel, rear package tray or the like.

The air distribution grill has four major components, all of which may be fabricated of metal but which preferably are molded of suitable plastic material. The four components are an elongated frame member 14, an elongated body member 15, and a pair of shutter members, a front shutter member 16 and a rear shutter member 17. The frame member 14 is substantially rectangular in shape having elongated substantially parallel side walls 18 and 19 and end walls 21 and 22. The side and end walls are capped by a perimetrical flange 23 which locates the frame member 14 in the instrument panel opening or recess 24. The longitudinally extending side walls 18 and 19 are concavely curved as at 25, see FIG. 4, for a purpose to be explained.

The elongated body member 15 is supported within the frame member 14 by the interengagement of its side walls 26 and 27 with the side walls 18 and 19 of the frame member 14. As best seen in FIG. 4, the exterior surfaces of the body member side walls 26 and 27 are convexly curved as at 28. The radius of curvature of each convexly curved surface 28 is complementarily equal to the radius of the curvature of each concavely curved surface 25 of the frame member side wall so that a cylindrical ball and socket relationship is achieved. This permits the body member to be tiltable about a longitudinal axis relative to the frame member.

The degree of tilt is controlled by stop portions 29 and 31 at the rear or inner upper and lower edges of the body member 15, as viewed in FIG. 4. It will be readily apparent that as the body member 15 is tilted in a clockwise direction about the longitudinal axis designated by the point 32, the stop 29 will abut the upper rear or inner surface 33 of the body member 15. If the body member is tilted in a counterclockwise direction about the longitudinal axis, the lower stop edge 31 will abut the lower chamfered inner or rear surface 34 of the body member 15.

The body member 15 is tiltable to a greater degree in a counterclockwise direction about the longitudinal axis 32 than it is in a clockwise direction. This degree of tilt in either direction is, however, a matter of design choice.

The body member 15 is formed with laterally extending ribs a plurality of which 35 are identically contoured and equally spaced, see FIGS. 5 to 8, inclusive. Each of the contoured ribs 35 is substantially triangular in shape in that it has a flat base portion 36 and convexly tapered side surfaces 37 meeting at an apex 38. The base 36 may be considered as being at the rear of the rib 35 and the apex 38 as being at the front (the discharge side of the air distribution grill). At each end of the contoured ribs is a modified rib 39 and 41. These ribs 39 and 41, which are at the left and right ends, respectively, of the row of contoured ribs 35 as viewed in FIG. 5 are provided with half-contoured portions. The left rib 39 is separated from an end wall 42 of the body member 15 by an enlarged slot 43 whereas the right rib 41 forms the right end wall of the body member 15. It will be noted that the body member 14 and therefore the ribs 35 are longitudinally fixed. The spaces 44 between the ribs 35 may be considered as air flow apertures.

Air flow through the air flow apertures 44 is controlled by means of the front shutter member 16 and the rear shutter member 17. Each shutter member is longitudinally slidable in opposed pairs of grooves 45 and 46 in the body member 15. The grooves 45 are located at the front side of the ribs 35 and the grooves 46 at the rear side.

The front shutter 16 comprises a rectangular member 16 having a plurality of ribs 47 each of generally triangular configuration. Each rib 47 has a substantially flat base 48 and concavely curved side walls 49 terminating in an apex 51. The concavity of each side wall 49 of each rib 47 is complementary to the convexity of each adjacent side wall 47 of each rib 35. Thus, as best seen in FIGS. 5 and 7, the shutter member 16 when in selective positions relative to the body member 15 coacts with the latter to form channels which are extensions of the air flow apertures 44 and which are functional to direct the air flow in selective directions. At one end, the right end as viewed in FIGS. 4 and 5, the front shutter member has an upstanding hand grip portion 52 which may be grasped to slide the shutter member longitudinally of the body member 15 in the opposed grooves 45.

The rear shutter member 17 comprises an elongated member the longitudinal marginal edge portions of which project into the opposed grooves 46 while slidably retaining the shutter member 17 on the body member 15. This rear shutter member 17 has a plurality of equally spaced ribs or vanes 53 each of which has a flat base 54 and convexly curved side walls 55 terminating in an apex 56. The ribs or vanes 53 have the same spacing as the ribs 35 of the body member 15 and each base portion 54 is complementary to each base portion 36 of the body member ribs. The flat base portions 54 lie in a plane parallel and contiguous to the plane defined by the flat rear bases or base portions of the ribs 35.

The ribs or vanes 53 are interconnected by a pair of parallel longitudinally extending vanes 57 which reduce turbulence in the flow of air when the body member 15 and the shutters 16 and 17 carried thereon are tilted about the longitudinal axis 32. At its left end, as viewed in FIG. 5, the rear shutter member 17 is provided with an upstanding hand grip member 58 which projects through the enlarged slot 43 in the body member 15. It will be readily apparent that this handle 58 may be used to manipulate the rear shutter for sliding movement longitudinally of the body member 15 in the grooves 46.

OPERATION

The operation of the air distribution grill 11 embodying the present invention is very simple. With the ribs or vanes 53 on the rear shutter member 17 in alignment with the ribs 35 on the body member 15, the direction of the air flow from the air distribution grill is dependent on the position of the ribs 47 on the front shutter member 16 relative to the ribs 35 on the body member 15. Referring first to FIG. 5, when the front shutter member 16 is positioned at the extreme right end of the air distribution grill 11, the shutter member ribs 47 coact with the body member ribs 35 to provide curved air distribution channels which direct the air flow toward the left end of the air distribution grill as shown by the arrows 59.

When the front shutter member 16 is at the extreme left end of the air distribution grill 11, the ribs 47 thereon coact with the ribs 35 on the body member 15 to form air distribution channels which direct the air flow toward the right end of the air distribution grill as indicated by the arrows 61 as indicated in FIG. 7. When the front shutter member 16 is positioned intermediate its extreme right or left positions relative to the body member 15, the ribs 47 will assume a relationship to the ribs 35 as shown in FIG. 6 and the air flow from the air distribution grill will be in a direction substantially normal to the plane of movement or the front face of the shutter member 16 as shown by the arrows 62 in FIG. 6.

Control of the volume of air flow through the apertures 44 is achieved by manipulation of the rear shutter. As shown in FIG. 5, the vanes 53 are in alignment with the ribs 35, thus providing for full air flow through the apertures 44. The handle 58 on the rear shutter member 17 is shown at its extreme left position. If the handle 58 is pushed toward the right until it abuts the rib 39 of the body member 15, the position shown in FIG. 8, the ribs or vanes 53 are laterally offset from the ribs 35 so as to close off the apertures 44 and no air will flow through the air distribution grill 11. At any position intermediate the extreme on or extreme off positions, the volume of air flowing through apertures 4 will be proportionately throttled.

FIGS. 1 and 4 illustrate the air distribution grill as it would appear when mounted horizontally in an instrument panel or the like. In the position shown in FIG. 4, air flow would be in a substantially horizontal direction. Should it be desired to have the air deflected downwardly, it is only necessary to rotate the body member clockwise about the longitudinal axis 32. The degree of downward deflection is controlled by the relationship between the stop edge 29 and the upper inner rear surface 33 of the body member 15. If it is desired to have the air deflected in an upward direction, it is only necessary to rotate the body member in a counterclockwise direction about the longitudinal axis 32. The body member may be rotated between the limits as determined by the stop edge 31 and the lower inner rear surface 34 of the body member 15.

The directions mentioned above are only relative with reference to the position of the air distribution grill as illustrated in the drawing. It will be understood that the air distribution grill could be mounted so that its longitudinal axis will extend in a substantially vertical direction rather than in a horizontal direction or in any position inbetween.

I claim:
1. An air distribution grill comprising:
an elongated frame member,
an elongated body member supported within said frame member,
said frame member and said body member each having substantially parallel, interengaged, complementarily curved side walls providing for limiting tilting movement of the body member relative to the frame member about a longitudinal axis,
front and rear shutter members,
guide means slidably mounting said front and rear shutter members in juxtaposition to the front and rear faces, respectively, of said body member for longitudinal movement thereon, said body member and front and rear shutter members having a plurality of laterally spaced contoured ribs with the spaces between the latter providing air flow apertures, and operating means for independently positioning said front and rear shutter members on the body member to relatively position said spaced ribs to control the quantity and direction of air flow through the air distribution grill.

2. An air distribution grill according to claim 1, in which:

a plurality of the body member ribs have flat rear faces and are arcuately tapered toward their front apices, and a plurality of the rear shutter member ribs have flat faces in juxtaposition to a plane defined by the flat rear faces of the body member ribs, said rear shutter member being longitudinally shiftable between a position in which the ribs thereon are in alignment with the body member ribs to a position in which the rear shutter member ribs close the apertures between the body member ribs, the position of the rear shutter member controlling the quantity of air flow through the distribution grill.

3. An air distribution grill according to claim 1, in which:

a plurality of the body member ribs are convexly tapered from the rear face of the body member toward their front apices, and a plurality of the front shutter ribs are concavely tapered from their front face rearwardly toward their apices, the convex taper of the body member ribs being complementary to the concave taper of the front shutter member ribs, said front shutter member being longitudinally shiftable between extreme positions in which the front shutter ribs and the body member ribs coact to channel air discharged from said air distribution grill toward either end of the grill, said coacting ribs when said shutter member is positioned intermediate the extreme positions directing air flow in a direction substantially normal to the plane of movement of the shutter member.

4. An air distribution grill according to claim 1, in which:

a plurality of the body member ribs are substantially triangular with flat rear bases and forwardly extending convexly tapered side walls, a plurality of the front shutter member ribs are substantially triangular and have concavely tapered side walls extending rearwardly from their front bases, the convex taper of the body member ribs being complementary to the concave taper of the front shutter member ribs, and a plurality of the rear shutter member ribs have flat faces in coplanar relationship to the flat bases of the body member ribs, said shutter members being longitudinally shiftable relative to the body member into positions in which the ribs on the rear shutter member coact with the ribs on the body member to control the quantity of the air passing through the air distribution grill, and in which the ribs on the front shutter member coact with the ribs on the body member to channel air discharged from the air distribution grill toward either end of the latter or when in an intermediate position in a direction substantially normal to the face of the air distribution grill.

5. An air distribution grill according to claim 1, in which:

the frame member, body member, and front and rear shutter members are formed of plastic material having a sufficient degree of resilience to permit assembly by snap-fit interengagement of the members with each other.

References Cited

UNITED STATES PATENTS 2,976,795  3/1961  Brugler _____ 98—108 X
3,012,494  12/1961  Drummond _____ 98—40

WILLIAM E. WAYNER, Primary Examiner

U.S. Cl. X.R.

98—2, 41